(12) United States Patent
Hough

(10) Patent No.: US 6,866,513 B2
(45) Date of Patent: Mar. 15, 2005

(54) FIRE-FIGHTER TRAINING

(75) Inventor: Stephen John Hough, Derbyshire (GB)

(73) Assignee: Kidde IP Holdings Limited (GB)

( * ) Notice: Subject to any disclaimer, the term of this patent is extended or adjusted under 35 U.S.C. 154(b) by 0 days.

(21) Appl. No.: 10/220,628

(22) PCT Filed: Mar. 1, 2001

(86) PCT No.: PCT/GB01/00884
§ 371 (c)(1),
(2), (4) Date: Nov. 18, 2002

(87) PCT Pub. No.: WO01/64293
PCT Pub. Date: Sep. 7, 2001

(65) Prior Publication Data
US 2003/0175662 A1 Sep. 18, 2003

(30) Foreign Application Priority Data

Mar. 1, 2000 (GB) .............................. 0005012
Apr. 21, 2000 (JP) ........................ 2000-121434
Jun. 12, 2000 (GB) .............................. 0014311
Feb. 1, 2001 (GB) .............................. 0102569

(51) Int. Cl.[7] .......................................... G09B 19/00
(52) U.S. Cl. .................................................. 434/226
(58) Field of Search ................................ 434/219, 226

(56) References Cited

U.S. PATENT DOCUMENTS 3,799,490 A * 3/1974 Bunger ........................ 249/18
3,807,115 A * 4/1974 Baltz ............................ 52/581
3,927,498 A * 12/1975 Benedetti ..................... 52/79.1
4,303,396 A * 12/1981 Swiatosz ..................... 434/226
4,807,412 A * 2/1989 Frederiksen .................. 52/177
4,968,170 A * 11/1990 Wilson et al. ................. 404/2
4,983,124 A * 1/1991 Ernst et al. ................. 434/226
5,055,050 A * 10/1991 Rogers et al. .............. 434/226
5,180,331 A * 1/1993 Daw et al. ................... 454/187
5,226,818 A * 7/1993 Feiock et al. ............... 434/226
5,291,714 A * 3/1994 Wright et al. ................. 52/664
5,374,191 A * 12/1994 Herman et al. ............. 434/226
5,447,437 A * 9/1995 Joynt et al. ................. 434/226
5,752,835 A * 5/1998 Whitmer, Sr. ............... 434/226
5,823,784 A * 10/1998 Lane .......................... 434/226
5,888,072 A * 3/1999 Musto et al. ............... 434/226
6,129,552 A * 10/2000 Deshoux et al. ............ 434/226
6,179,620 B1 * 1/2001 Schmid ...................... 434/226
6,256,952 B1 * 7/2001 Fahy et al. ................... 52/263

FOREIGN PATENT DOCUMENTS

WO   WO 97/34658 A1   9/1997

* cited by examiner

Primary Examiner—Kurt Fernstrom
(74) Attorney, Agent, or Firm—Stevens & Showalter LLP

(57) ABSTRACT

A fire simulator comprises fuel distribution means under a grating through which fuel emanating from the fuel distribution means can rise in use to create flames extending above the grating, wherein the grating includes a plurality of grating elements that together define a walkable working surface for a fire-fighter using the simulator.

35 Claims, 14 Drawing Sheets

FIRE-FIGHTER TRAINING

BACKGROUND OF THE INVENTION

This invention relates to fire-fighter training. In particular, the invention relates to fire-fighter training installations such as those used to simulate fires in aviation scenarios, notably those of aircraft crash-landings.

The invention is not limited to aviation fire-fighting scenarios: it has application in simulators for other fire-fighting scenarios such as road or railway crashes that, like an aircraft crash-landing, can involve a substantial fuel spill. Indeed, preferred aspects of the invention involve simulators that can be adapted for a variety of different fire simulations not necessarily involving fuel spillage, including aircraft, collapsed buildings, road-vehicles, trains and multiple-scenario incidents. Such simulators can also be used for 'joint services' training, i.e. to train members of other emergency services, notably the police and paramedics, who must co-ordinate their work with fire-fighters from time to time.

Speed and skill are of the essence to all fire-fighters but fire-fighting in aviation scenarios, such as aircraft crash-landings, requires particularly fast response and skilled teamwork if loss of life is to be minimised. It is generally accepted that unless a burning crash-landed aircraft is accessed and the fire suppressed within two minutes of ignition, there is little hope of survival for those on board who may have survived the landing itself. As there is so little time for mistakes, this places extraordinary demands upon the skill of fire-fighters based at civil airports and military airbases. There are corresponding demands upon the training of those fire-fighters, both as individuals and as a team, and hence upon the quality of the simulators on which those fire-fighters practice.

All substantial airports and airbases have dedicated fire tenders on standby for substantially immediate high-speed access to any crash site within the airport or airbase perimeter. Such tenders include vehicles known in the art as Major Airport Crashtrucks or MACs. Upon approaching the stricken aircraft, the practice is to drive the tenders close to the aircraft for the purpose of laying down fire-retardant foam and simultaneously gaining access to the fuselage of the aircraft to free its passengers and crew. Indeed, recent practice in civil aviation fire-fighting is to drive a specially-adapted tender right up to the aircraft for the purposes of puncturing its fuselage and injecting foam to protect people who may still be alive within.

Of course, accidents are characterised by their unpredictability and there is no way of knowing what difficulties fire-fighters will encounter when they reach a crash-landed aircraft. Their fire-fighting strategy must therefore be fully flexible. For example, the orientation of a burning aircraft with respect to the prevailing wind will have a considerable influence upon how the fire-fighters can approach the aircraft, suppress the fire and access the fuselage. Also, obstructions such as airport vehicles and broken-off engines, undercarriage components, wings or other parts of the aircraft can block access to the fuselage and will, in all likelihood, be on fire themselves. This is all quite apart from the different types of aircraft fire with which fire-fighters must contend: a fire confined to an engine or the undercarriage, for example, will require a quite different strategy to a fire involving spilled fuel.

The demands of fire-fighter training have led to the emergence of fire-fighting simulators in which fluid-fuelled flames are controlled to respond realistically to efforts by trainees to suppress them, in so-called 'hot-fire' training. Aviation fire simulators are typically sited at an airfield or airbase, close to the fire-fighters' base at that facility. Flame generators can extend across the ground to simulate a fuel spill and can also be associated with mock-ups of above-ground structures associated with a fire scenario, such as a metal tube representing a section of aircraft fuselage which may have structures representing wings and engines to one or both sides, or a metal box representing an airport vehicle. In an analogy apt for acting-out scenarios, these mock-ups are referred to in fire-fighter training as 'props'. That term will be used hereafter in this specification when referring to such mock-ups.

In early days, the fuel used in aviation fire simulators was liquid fuel such as oil or jet fuel but whilst their flames are realistic in appearance, those fuels give rise to levels of pollution that would be unacceptable today in frequently-used simulators that are often situated near urban settlements. Consequently, there has been a move toward gas-fuelled simulators and here the challenge is to maintain realism and controllability.

The aim of any fire simulator is to mimic the behaviour of a flame as it develops from ignition to eventual extinction. Spilled liquid fuel burns in a similar manner to the same fuel in an open-topped tank. Upon ignition, the height of the flames is initially quite small. However, the flames progressively grow larger and spread quickly across the full area of the spillage, eventually reaching a limiting height determined by the burning velocity of the flame. The flame grows during this phase because its radiant heat promotes the evaporation of liquid fuel. The increased rate of evaporation causes the flame to grow and this applies additional radiant heat to the remaining liquid fuel, increasing the rate of evaporation still further until the burning velocity of the flame prevents further flame growth.

Reference is made at this point to FIG. 1, whose source is Drysdale, D. *An Introduction to Fire Dynamics*, $2^{nd}$ edition, p. 12, published in 1998 by John Wiley & Sons. This is a schematic representation of a burning surface showing the heat and mass transfer processes involved in combustion. Importantly, it shows that in all fire occurrences, heat flux supplied by the flame ($Q_F''$) transfers to the fuel surface. This heat transfer then increases the volatility of the fuel, hence adding to the conflagration.

Clearly, therefore, a key aspect of simulating a liquid fuel spill fire is to transmit radiant heat to liquid fuel so as to promote the evaporation of that liquid fuel.

An example of a gas-fuelled fire-fighting simulator is disclosed in U.S. Pat. No. 5,055,050 to Symtron Systems, Inc., which comprises a diffuser such as a pan filled with a bed of dispersive medium such as water or gravel in which a burner system comprising a network of perforated pipes is submerged or buried. The pipes carry pressurised liquefied petroleum gas (LPG)—preferably propane—which is initially in its liquid phase but, with reducing pressure, flashes into the vapour phase within the pipes as it approaches the holes in the pipes. Thus, the pipes contain a mix of vaporising liquid propane and propane vapour. The gas issuing from the pipes diffuses as it rises through the dispersive medium and then burns on the surface of the dispersive medium. Two or more pans can be used side-by-side.

Whilst such use is not specifically disclosed in U.S. Pat. No. 5,055,050, it is well known in the art that the flames can be controlled to respond appropriately to the trainee fire-fighters' actions. For example, the fuel flow rate in different parts of the network of pipes or in different pans can be varied under central control via remote valves. It is also known that the pans can be used beside a prop such as a mock aircraft fuselage to lend further realism to training scenarios.

The simulator arrangement of U.S. Pat. No. 5,055,050 enjoys certain benefits such as low cost and is suitable for many training requirements, but the exposed bed of the dispersive medium causes several problems that the present invention seeks to overcome.

One of the major problems of an exposed bed is that the dispersive medium lacks structural integrity and can bear no significant load. This means that props cannot be supported on the bed and that vehicles cannot drive over the bed without risking fracture of the pipes underneath the surface and so possibly causing a genuine conflagration. It follows that areas of the simulator are artificially off-limits to fire tenders and, for safety reasons, have to be delineated as such with markers or barriers that extend beyond the forbidden area.

Given the reliance upon close approach of fire tenders to aircraft in aviation fire scenarios, it is hugely unrealistic to prevent tenders, in training, accessing areas of the simulator installation that, in an analogous real fire, correspond to areas around an aircraft upon which the tender would advantageously be driven. This problem is particularly acute given that tenders must be driven artificially gently and slowly during training to avoid accidentally driving onto the forbidden areas: in real life, their drivers will approach an accident site at the highest possible speed and brake as hard and late as they can. It is similarly unrealistic to have to place props beside rather on top of the bed, where the simulated fire is raging.

Another disadvantage of the exposed bed of dispersive medium is that props cannot be dragged across the bed if it is desired to rearrange their position: they can only be lifted into place by a crane. This limits the adaptability of the simulator by increasing the cost and timescale of any changes in the orientation or layout of the props, such as may be necessary to track changes in wind direction, if indeed such changes are possible within the confines imposed by the extent of the beds surrounding the location of the prop. Aside from developing fire-fighting skills applicable to different situations, the ability to vary training scenarios is important to maintain the trainees' interest and focus.

There is also the problem that fire-fighter trainees cannot walk safely on the bed of dispersive medium as they fight the simulated fire: even a shallow pan of water is self-evidently unsuitable for access on foot, and the alternative medium of gravel or other particulate refractory material presents a trip hazard that could cause a trainee to stumble into the flames. This drawback further deprives the simulator of realism, because, in real life, fire-fighters will expect to advance on foot as they fight back the flames whereas, when using the simulator, their advance will be limited by the margins of the bed.

Yet another drawback of the exposed bed of dispersive medium is that the medium can be disturbed by the flow of water used by trainee fire-fighters to simulate foam. That flow typically reaches 11,000 litres per minute from each nozzle used to fight the fire. Where the dispersive medium is a particulate medium such as gravel, for example, such a powerful jet of liquid can wash the gravel about within the pan, removing gravel from some parts of the pan and piling it up elsewhere in the pan. At best, this varies the depth of the bed of gravel to the detriment of optimal dispersion and combustion of the fuel rising from the perforated pipes. The behaviour of the simulator may therefore vary unpredictably from one training exercise to the next, unless the gravel is raked back into a level layer between those exercises. At worst, sections of the pipes can be exposed, depriving the out-flowing fuel of any dispersive effect and exposing the pipes to the full radiant heat of combustion.

The present invention seeks to solve these problems and therefore to extend the use of gas-fuelled simulators into other parts of the simulator market, providing a simulator in which the realism of training is as great as can be allowed by the safety of those who operate and train on it.

SUMMARY OF THE INVENTION

Broadly, the invention resides in a fire simulator comprising fuel distribution means under a grating through which fuel emanating from the fuel distribution means can rise in use to create flames extending above the grating, wherein the grating includes a plurality of grating elements that together define a walkable working surface for a fire-fighter using the simulator. It is further preferred that the working surface can be driven upon by a fire-fighting vehicle such as a fire tender or a Major Airport Crashtruck without damaging the fuel distribution means, and that such a vehicle can drive on and off the working surface from and onto a surrounding or neighboring apron. These features of the invention enable realistic fire-fighting training by making the flames and related scenarios fully accessible to fire-fighters on foot or in a vehicle.

The aim of the invention is further assisted if the working surface is aligned at its periphery with a surrounding or neighbouring apron. To this end, the fuel distribution means is advantageously housed in a recess below the grating, the recess having a base below the level of the surrounding or neighbouring apron. There may be a pan in the recess containing the fuel distribution means.

The grating elements may be supported by grating supports that stand beside the fuel distribution means below the grating elements. Those grating supports can space the grating elements from the fuel distribution means. For easy assembly and reconfiguration, especially in secondary incident training scenarios, the grating elements are preferably removable from the grating supports and more preferably can simply be lifted away from the grating supports and out of the working surface.

The grating supports are elegantly defined by a plurality of hollow support frames, each of which can include upright peripheral walls surrounding a central cavity. For example, the walls can be in a rectangular or square arrangement around a correspondingly-shaped cavity. The walls of the frame lie against the base of the recess or the pan in use and so preferably have lower edge portions shaped to define a drainage opening. Upper edge portions of the frames can be shaped to receive an array of grating elements that bridge the cavity so that the array defines a portion of the working surface. For instance, the upper edge portions may be castellated. The support frames are suitably laid in intersecting rectilinear arrays with walls of neighbouring frames aligned with and facing one another. Fixing plates attached to the lower edge of walls of the frame may then provide for fixing the frame to a foundation or base such as the base of the aforementioned recess.

The support frames are preferably arranged such that a plurality of grating elements are disposed in a parallel array across the cavity. In that case, where the support frames are laid in a row, the orientations of grating elements in neighbouring frames of that row are preferably mutually orthogonal. This helps to dissipate the kinetic energy of incoming jets of water and so minimises outwash of any particulate material associated with the fuel distribution means under the grating.

To accommodate thermal expansion without distortion, it is advantageous for the grating elements to be movable to a limited extent with respect to the support frame. Elegantly, movement of the grating elements can be limited by encountering a neighbouring support frame.

The invention can be applied to various burner arrangements including those in which the fuel distribution means is buried, submerged or exposed. Thus, for example, the fuel distribution means may be covered by a fuel-dispersive medium from which dispersed fuel rises through the grating. In that case, the fuel-dispersive medium can be accommodated in the cavities of an array of support frames to define a bed extending under the working surface that is subdivided by the walls of those support frames.

It is also possible for the fuel distribution means is associated with fuel-heating means for applying to the fuel distribution means radiant heat that emanates from the flames in use, thereby promoting vaporisation of liquid fuel in the fuel distribution means. The fuel-heating means can absorb radiant heat emanating from the flames and then radiate to the fuel distribution means some of the heat thus absorbed. The fuel-heating means can also reflect some of the radiant heat emanating from the flames.

The simulator of the invention can further include a service trench being surrounded by or bordering the working surface that includes a movable or removable access cover lying flush with the working surface. That cover can be vented to permit free venting of gases from the service trench and where the service trench contains control equipment for lighting and fuelling the flame, the trench preferably defines walls having cavities into which the control equipment is recessed for protection from heat and water. The service trench can also drain fire-fighting water or rainwater that runs through the grating.

It is greatly preferred if the grating elements remain below 200 Celsius in use, as this is the usually threshold for the use of standard fire-fighter personal protection equipment such as footwear.

The simulator of the invention enables a prop to be supported by its working surface, and for the prop to be moved across the working surface while being supported by the working surface.

This International patent application claims priority from the Applicant's United Kingdom Patent Application Nos. 0005012.0, 0014311.5 and 0102569.1, the contents of which are incorporated herein by reference. Those applications are not continuing in their own right as they refer to prototype development but copies of them are available on the public file of this application, from the date on which this application is published. The discussion of flame characteristics and their testing and analysis set out particularly in Application Nos. 0005012.0 and 0014311.5 may be of background interest to readers of this specification.

BRIEF DESCRIPTION OF THE DRAWINGS

In order that this invention may be more readily understood, reference will now be made, by way of example, to the accompanying drawings, in which.

DETAILED DESCRIPTION OF THE INVENTION

Figure 1:
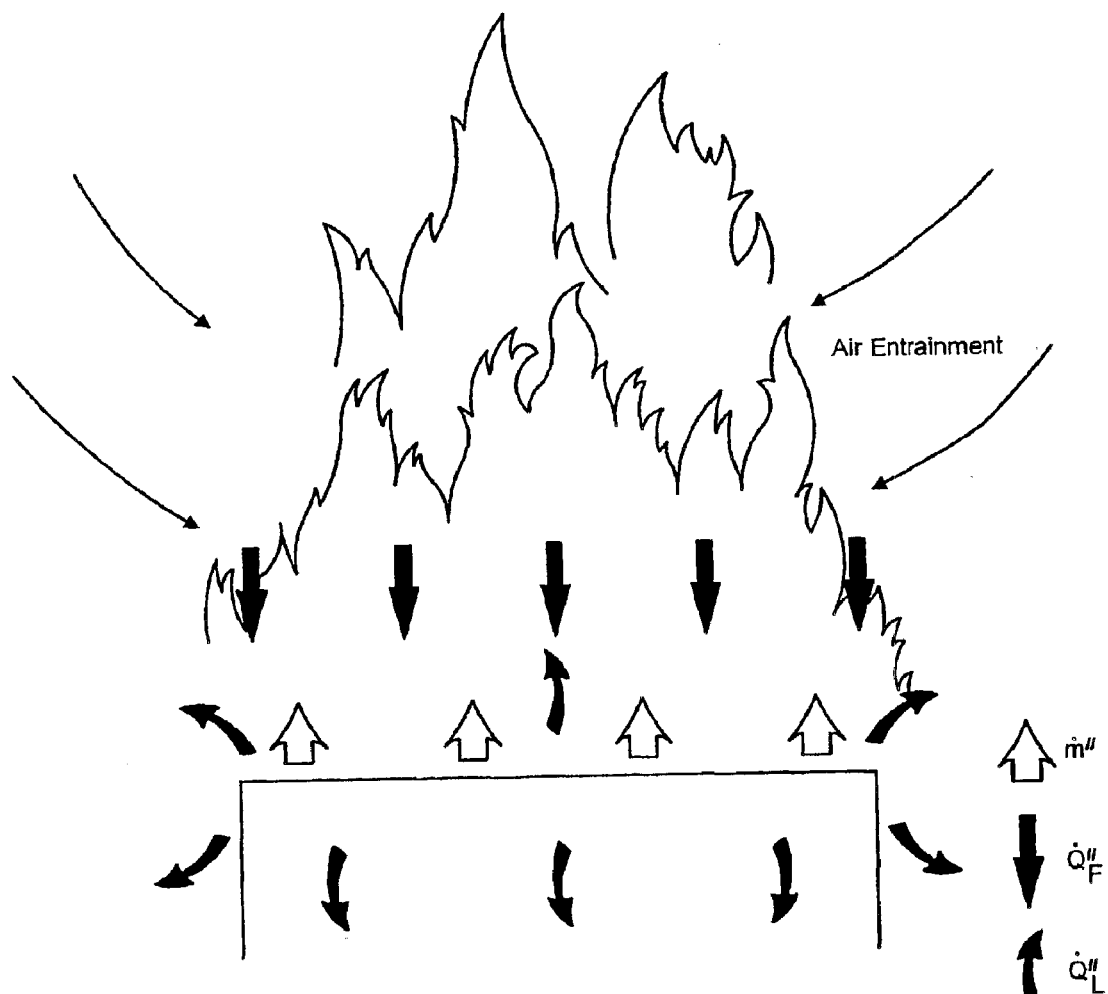
FIG. 1, which has already been described, is a diagram of a burning surface.
Figure 2:
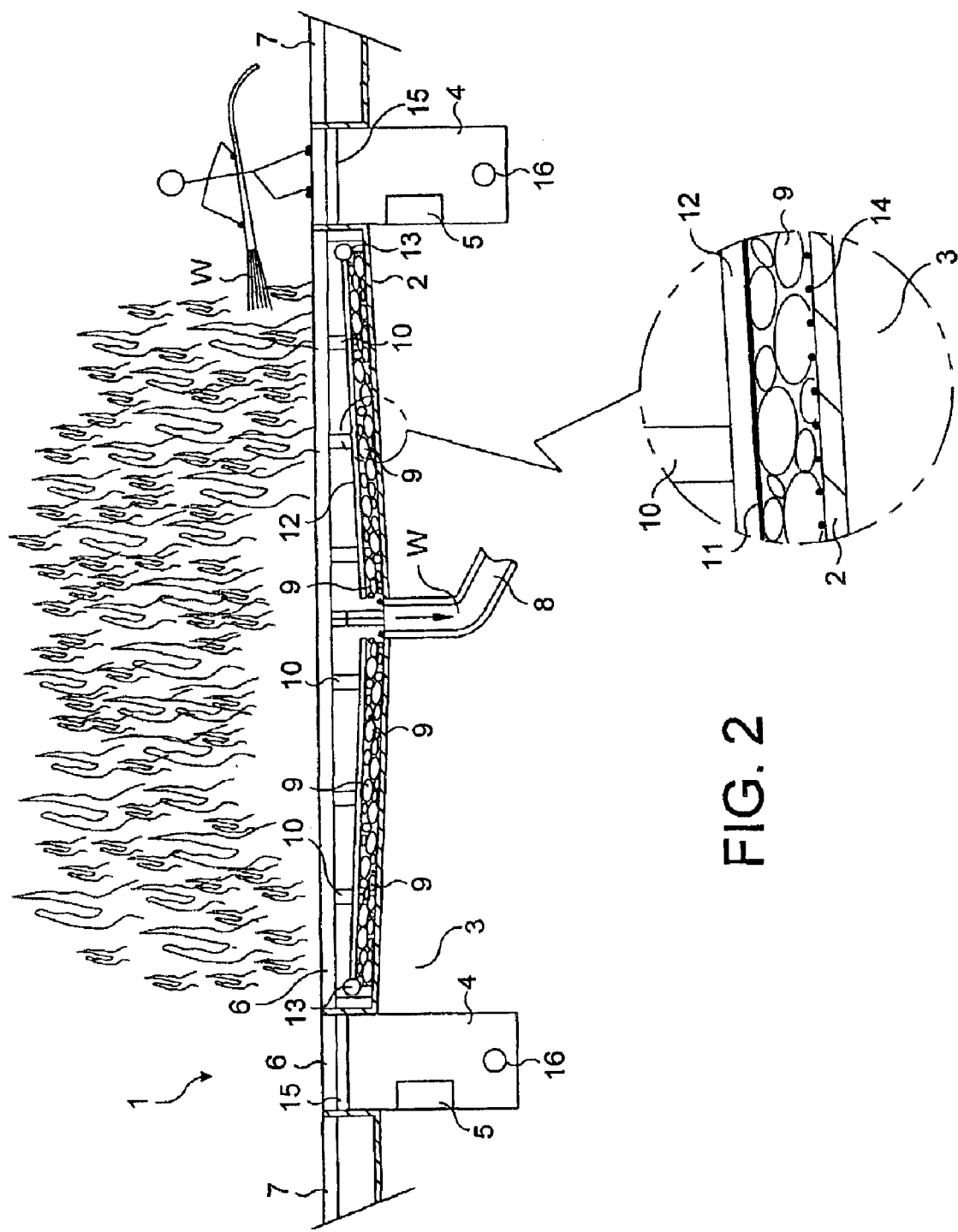
FIG. 2 is a schematic sectional side view of a fuel spill simulator in accordance with a first embodiment of the invention.

Referring firstly to FIG. 2 of the drawings, in a first embodiment of the invention, a fuel spill simulator 1 comprises a steel pan 2 set into concrete foundations 3 that support the pan 2. The pan 2 may, for example, be circular or rectangular in plan, and is bordered by service trenches 4 that contain control equipment 5 and services such as fuel supply pipework and power or control cabling (not shown). The trenches 4 shown in FIG. 2 may, of course, represent opposed sections of one continuous trench 4 that surrounds the pan 2.

The pan 2 and the trenches 4 are surmounted by a grating 6 that defines a flat, level working surface on which a trainee fire-fighter can walk and upon which a fire-fighting vehicle can preferably drive. Full details of the grating 6 will be given later. In the embodiment illustrated, the working surface defined by the grating 6 extends beyond the trenches 4 into neighbouring or surrounding areas 7 on the other side of the trenches 4 from the pan 2, which areas may surmount neighbouring pans of similar design. In any event, the grating 6 should be flush with the neighbouring or surrounding areas 7 to minimise trip hazards and will eventually extend to a contiguous concrete apron or blockwork surface (not shown) with which it preferably defines a continuous substantially level surface.

The base of the pan 2 is dished slightly to promote drainage of fire-fighting water W or precipitation through a central drain 8, from which the water W is preferably filtered and recycled. The pan 2 supports a layer of gravel 9 of substantially uniform thickness and a plurality of vertical grating supports 10 that support the grating 6 at intervals across its width over the pan 2. The supports 10 extend from the grating 6 to the pan 2 and so extend through a mesh 11 over the gravel 9 such that their base portions are surrounded by gravel 9. It will be evident that in view of the dished shape of the pan 2, the supports 10 are of various lengths to suit their position with respect to the centre of the pan 2, while keeping the grating 6 level.

Figure 3:
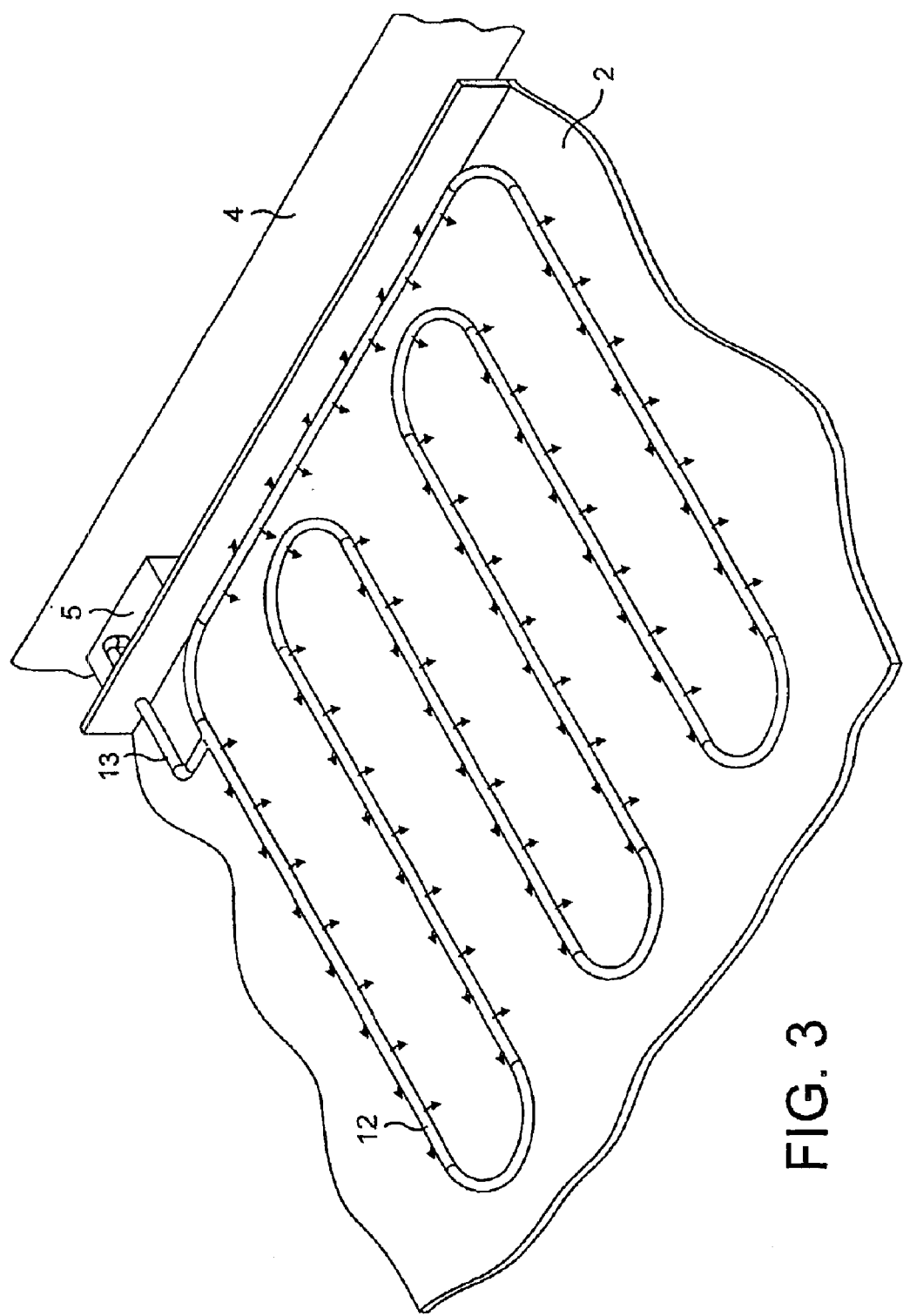
FIG. 3 is a perspective view of a serpentine array of fuel distribution pipes being part of the first embodiment of the invention.

Exposed fuel distribution pipework 12 constituting a burner extends over the gravel layer 9 and the mesh 11 and around the supports 10 in a sinuous, serpentine array. The pipes 12 of the array are preferably of maintenance-free stainless steel. As can be seen in FIG. 3 which shows an array of pipes 12 over the pan 2 but omits the intermediate gravel layer 9 for clarity, the pipes 12 are perforated to define downwardly-facing orifices, holes or nozzles for the egress of propane supplied from a supply pipe 13 leading from control equipment 5 within the trench 4 beyond the outer edge of the pan 2. The propane is in the liquid phase under pressure before it enters the pipes 12, but flashes into the vapour phase as it flows through the pipes 12 before its emergence from the orifices, holes or nozzles in the pipes 12, whereupon the gas streams downwardly to approach the gravel layer 9.

During its journey through the pipes 12, a mix of propane vapour and swiftly-vaporising liquid propane is warmed by the radiant heat to which the pipes 12 are exposed. This promotes the evaporation of the remaining liquid fraction and the flammability of the fuel as a whole, which beneficially simulates the behaviour of a real fuel spill. The radiant heat radiates downwardly from the flames above the grating 6 and upwardly from the gravel layer 9, this latter radiation being due to reflection of radiant heat that originated from the flames, and heating of the gravel layer 9 itself by that heat. The openings of the grating 6 are large enough to permit substantial radiant heat flux to pass through the grating 6, but not so large as to present a trip hazard for fire-fighters walking on the working surface defined by the grating 6.

As can be seen in the enlarged detail view included in FIG. 2, an array of parallel or intersecting rods 14 sandwiched between the gravel 9 and the pan 2 act as groynes to resist movement of the gravel 9 with respect to the pan 2, especially down the slope of the dished pan base. Where the rods 14 intersect, they are preferably interlaced in woven manner to define openings for water drainage down the dished shape of the pan base 2. Retention of gravel 9 is further assured by the aforementioned wire mesh 11 that lies on top of the layer of gravel 9 under the fuel distribution pipework 12. Once heated in use, that mesh 11 can further contribute to the upwardly-radiating heat that warms the fuel distribution pipes 12 and the propane streams emanating from those pipes 12.

The enlarged detail view included in FIG. 2 also makes plain that the gravel 9 comprises various particle sizes. To be specific, the stone specification is of igneous rocks selected from the following group of classifications, namely: fine-grained granite; diabase; gabbro; basalt; and rhyolite. The stone is crushed and provided as sized aggregate conforming to ASTM-C33, grade 2 (or equivalent), as follows:

| Sieve | Size (nm) |
| --- | --- |
| 100% | 75 |
| 90–100% | 65 |
| 35–70% | 50 |
| 0–15% | 40 |
| 0–5% | 20 |

As can be seen in FIGS. 2 and 3, each trench 4 beside the pan 2 contains a fuel supply control unit for regulating the supply of fuel to the fuel distribution pipes 12 and a pilot control unit for lighting the fuel ejected from the pipes 12, which units are shown together as control equipment 5 hung on a side wall of the trench 4. The trench 4 is closed in use by a porous lid 15 under the grating 6 (omitted from FIG. 3), which lid serves to protect the control equipment 5 from radiant heat but can be opened to afford access to the control equipment 5 when required. The trench 4 also contains an air pipe 16 whose purpose is to purge the trench 4 of flammable and potentially explosive gases that may build up in use, when the trench 4 is closed by the lid 15. The air pipe 16 does this by introducing air to pressurise the trench 4: this helps to prevent dangerous contaminants entering the trench 4 and forces excess air together with any contaminants out of the trench 4 through the porous lid 15.

Figure 4:
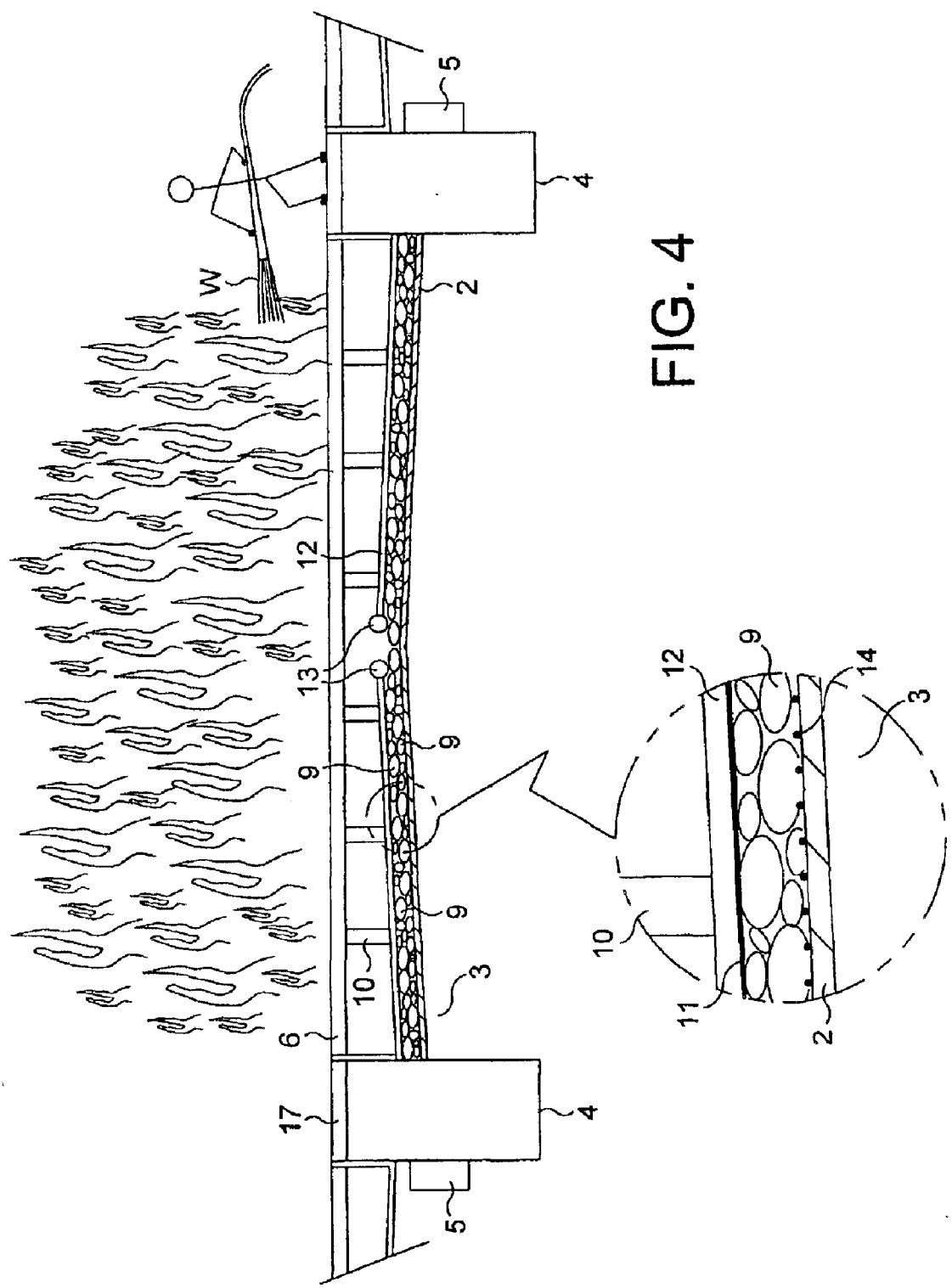
FIG. 4 is a schematic sectional side view of a fuel spill simulator in accordance with a second embodiment of the invention.

The embodiment of FIG. 4 is broadly analogous to that of FIGS. 2 and 3 in that it provides for full vaporisation of fuel by downward projection above gravel 9, so like numerals are used for like parts. The key differences are that, in FIG. 4:

the pan 2 is cambered so that water runs outwardly from the centre and drains into the trench(es) 4;

the supply pipes 13 that supply the fuel distribution pipework 12 are centrally located with respect to the pan 2, inboard of the fuel distribution pipework 12, rather than being at the outer edge of the pan 2;

the trenches 4 lack lids and so are open in the sense that they vent freely to atmosphere through vented covers 17; and the control equipment 5 is recessed into cavities in the trench wall for protection from heat and water.

The relative simplicity of the FIG. 4 embodiment will be evident upon comparing the drawings, which reduces its cost in comparison with the FIG. 2 embodiment but without sacrificing performance. Specifically, the trenches 4 perform the dual function of housing and providing access to the control equipment 5 and also draining water from the pan 2. This obviates the central dedicated drain 8 of FIG. 2. Furthermore, the open trench design provides inherent explosion relief without the need for the purging air pipes 16 of FIG. 2. Being recessed into the trench wall, the control equipment 5 no longer needs the protection of the porous lid 15 from radiant heat, but it will need to be positioned above the maximum water level that is predicted to be in the trench 4 under the maximum flow rate of incoming water W in use. It will also be apparent that the inboard supply pipes 13 that supply the fuel distribution pipework 12 can be shorter and simpler than the outboard supply pipes 13 of FIG. 2.

Figure 5:
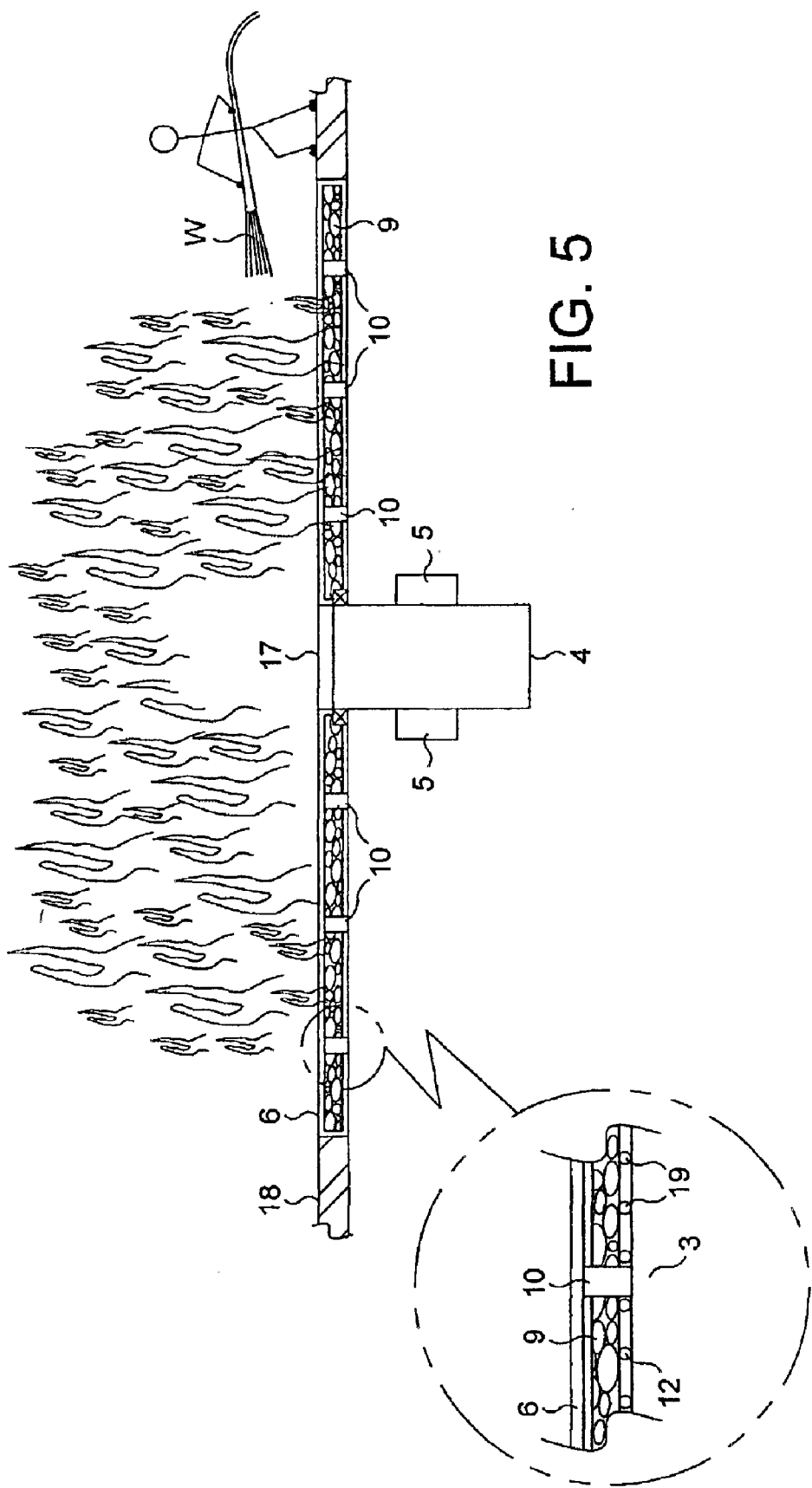
FIG. 5 is a schematic sectional side view of a fuel spill simulator in accordance with a third embodiment of the invention.

The embodiment of FIG. 5 also shares some features with the embodiments of FIGS. 2 and 4 and so again, like numerals are used for like parts. Unlike the embodiments of FIGS. 2 and 4, there is no pan; instead, a steel-edged recess is simply formed in a concrete slab foundation 3 to contain a layer of gravel 9. A typical depth for this recess would be up to 500 mm but this depends on the drainage requirements and what the total finished area of the simulator might be.

The gravel 9 is surmounted by a grating 6, preferably lying flush with the surrounding concrete or blockwork apron 18, that stands on vertical supports 10 extending upwardly from the base of the recess. In this embodiment, a trench 4 extends centrally along the recess and, as shown in the enlarged detail view included in FIG. 5, the fuel distribution pipework 12 lies on the base of the recess and so is disposed below the gravel layer 9. Again, the pipework 12 is perforated to define a series of holes, apertures or nozzles to eject fuel in use, but unlike the embodiments of FIGS. 2 and 4 which eject fuel downwardly for maximum evaporative effect, the fuel of the FIG. 5 embodiment can be ejected in any direction as it is intended to be dispersed by the gravel 9 in any event.

As in FIG. 4, the trench 4 of the FIG. 5 embodiment is closed by a vented cover 17 so as to vent explosive gases to atmosphere and the control equipment 5 is recessed into cavities in the trench walls. Also, whilst no camber or dish is evident from FIG. 5, the base of the recess is very gently inclined, sloped or dished toward the trench 4 to promote drainage of water from the gravel layer 9. It is advantageous that water does not drain away too quickly, so as to allow enough time for the flare-off of unburned gas; otherwise, that unburned gas may be entrained in a fast-moving stream of water and swept away to cause dangerous gas accumulations downstream.

To describe the grating 6 and its supports 10 in detail, the description of the FIG. 5 embodiment will now continue with reference to the remaining drawings. It will be evident to the skilled reader how the grating 6 and supports 10 shown in those drawings can be adapted to suit the embodiments of FIGS. 2 and 4 in which, unlike FIG. 5, the fuel distribution pipework 12 is exposed above the gravel layer 9. In particular, it will be readily apparent how most if not all of the grating features of the FIG. 5 embodiment can be applied to the preceding embodiments if a suitably adapted support is used.

Figure 6:
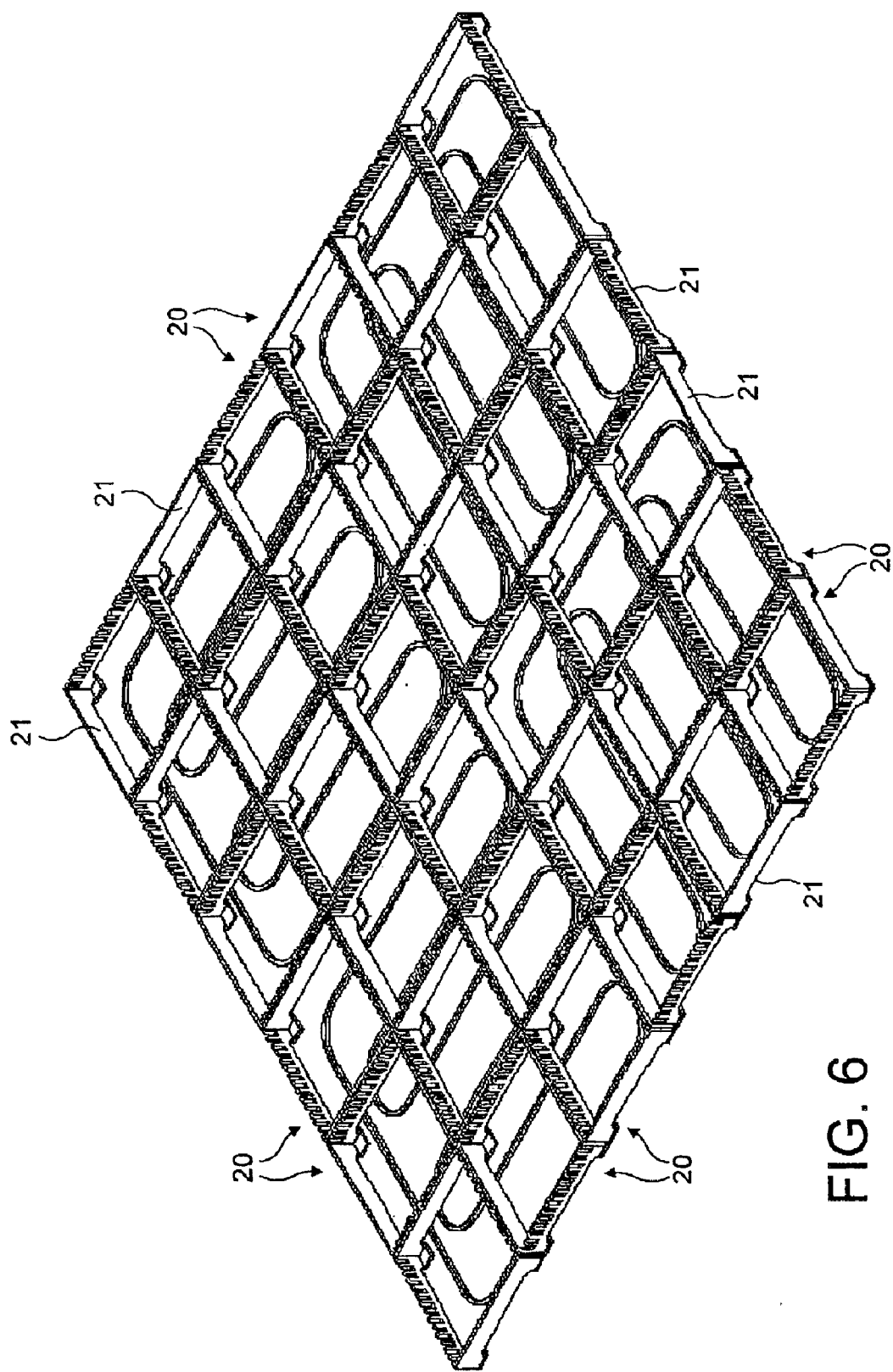
FIG. 6 is a perspective view of an array of support frames laid over serpentine arrays of fuel distribution pipes, as part of the third embodiment of the invention.
Figure 7:
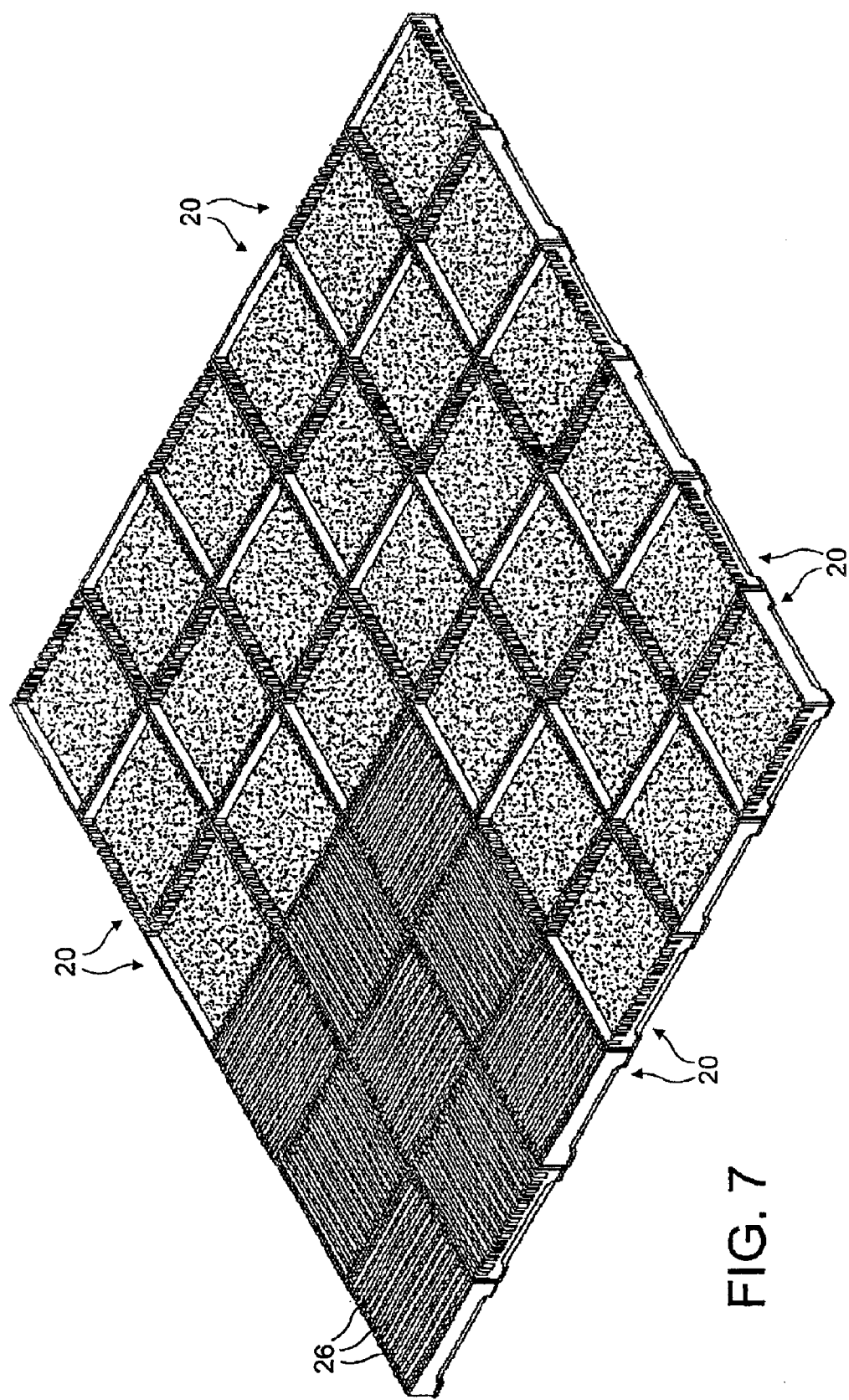
FIG. 7 is a perspective view corresponding to FIG. 6 but showing gravel laid over the fuel distribution pipes within all of the support frames and grating bars laid on some of those support frames over the gravel.

Referring then to FIGS. 6 to 9 of the drawings, the abovementioned grating supports 10 are defined by the upstanding walls 10A, 10B of fabricated square support frames 20 that are open to their top and bottom and that lie upon and are fixed to the base of the recess of FIG. 5. As best shown in FIGS. 6 and 7, the support frames 20 fit together in rectilinear arrays in mutually-abutting modular fashion, so that each support frame 20 helps to support its neighbours against side loadings in use. The walls 10A, 10B of the various support frames 20 thus lie in orthogonally-intersecting vertical planes.

Figure 8:
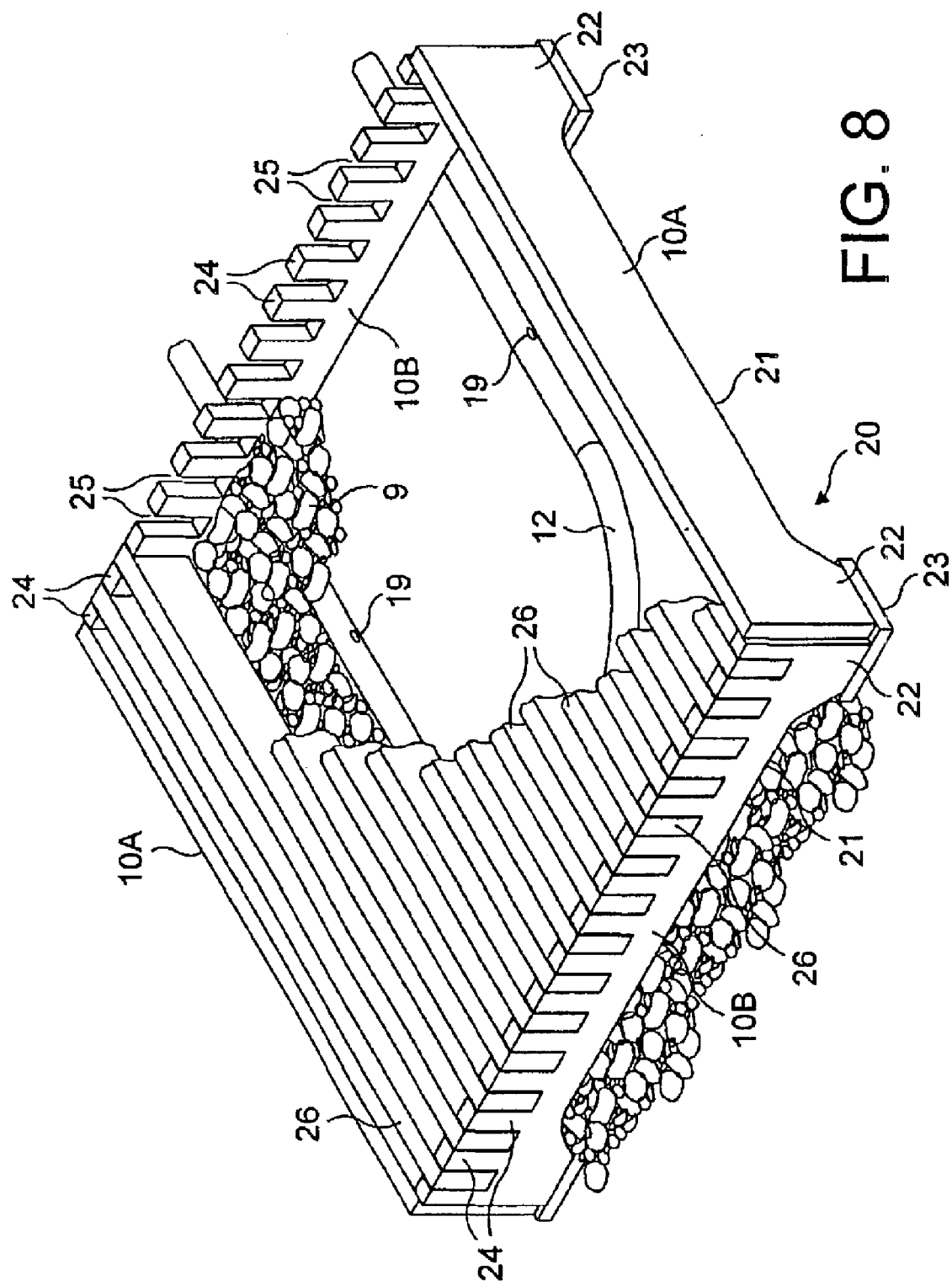
FIG. 8 is an enlarged perspective view of one of the support frames of FIG. 7, with the grating bars partially cut away to show gravel within the frame and that gravel being partially removed to show a fuel distribution pipe normally buried by the gravel.

Looking at any one of the support frames 20 as shown in FIG. 8, it will be noted that each of its four walls 10A, 10B is a flat elongate plate that is preferably of mild steel. Each plate is welded at each of its opposed ends to a respective orthogonally-disposed neighbouring plate, the welded junctions between the plates thus defining the corners of the square between the walls. Additionally, each plate has a cut-out 21 extending along one of its long edges, namely the lower edge that is disposed generally horizontally and facing downwardly in use. The ends of the cut-outs 21 are defined by feet 22 that have a square fixing plate 23 welded to them at the lower corners of the support frame 20. Each fixing plate 23 is therefore arranged to lie flat against the base of the recess and it is pierced by a through-hole (not shown) that enables the support frame to be bolted or otherwise fixed to the base. Whilst not essential, it is preferred that the support frames 20 are fixed down in this way so as to prevent excessive sideways movement or 'shuffling' of the support frames as vehicles drive over the working surface of the simulator.

The cut-outs 21 in the walls of the support frames 20 align with those of neighbouring support frames 20 in use, and have the dual function of accommodating the serpentine arrays of fuel distribution pipes 12 previously fixed at appropriate locations to the base of the recess, and of permitting water W to drain across the base of the recess toward the central trench of FIG. 5. Specific reference is made to FIG. 9 in this respect.

The plates defining two opposed walls 10B of each support frame are further provided with castellated upper edges defined by a row of upstanding oblong teeth 24 alternating with, and delineated by, oblong slots 25. As will be most apparent from FIGS. 7 and 8, the purpose of the castellations is to hold a set of oblong-section steel grating bars 26 bridging the open top of the support frame 20 in a parallel spaced array that defines a substantially flat, if locally slightly inclined, working surface level with the upper edges of the walls 10A, 10B and the teeth 24. Thus, the castellations hold the grating bars 26 at a suitable height above the fuel distribution pipes 12, and keep those bars 26 in the correct position during use of the simulator.

To this end, each grating bar 26 is held at one end in a slot 25 of one castellated wall 10B and at the other end by the corresponding slot 25 of the opposite castellated wall 10B. It will also be apparent from the drawings that the major cross-sectional axis of each grating bar 26 is oriented vertically to maximise its load-bearing ability against loads moving over the grating 6.

In practice, the grating bars 26 are fitted into the slots 25 only after the aforementioned layer of gravel 9 in the form of igneous stone chippings or other particulate dispersive medium has been poured into the open support frames 20 around the fuel distribution pipes 12, burying them to a depth of say 120 mm. The layer of gravel 9 substantially fills the space around the fuel distribution pipes 12 between the grating bars 26 and the base of the recess. It will be apparent that the gravel 9 has little room to move when so positioned and that any tendency it might have to shift sideways across the recess is limited by the baffle effect of the walls 10A, 10B that effectively partition the gravel bed 9.

Figure 10:
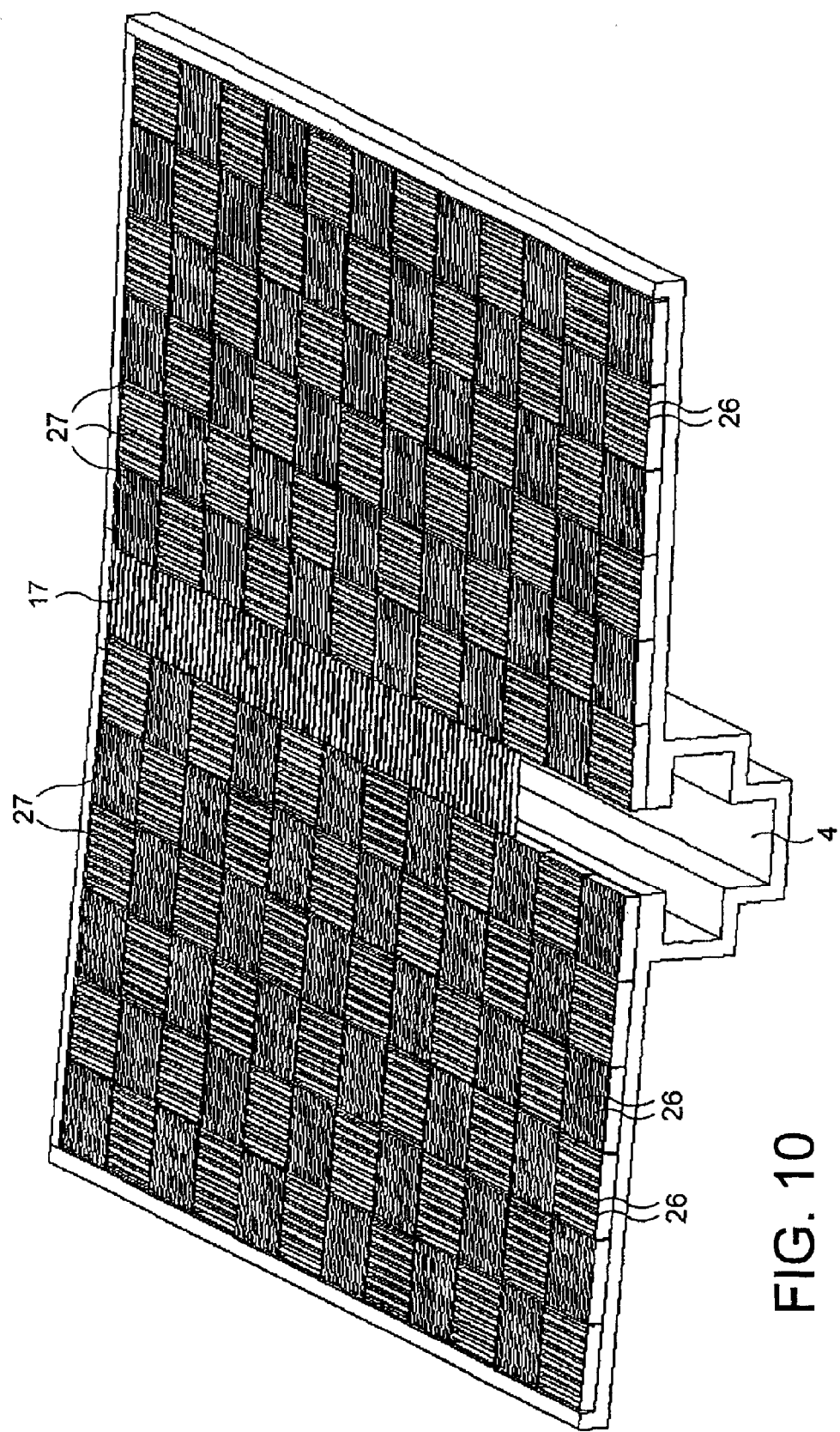
FIG. 10 is a schematic perspective view of a substantially complete simulator corresponding to FIG. 5.

It will also be noted, with particular reference to FIGS. 6, 7 and 10, that neighbouring support frames 20 in rows or columns of the array within the recess are turned through 90° with respect to each other so that their castellated walls 10B never abut one another. Thus, as best shown in FIG. 10, the grating bars 26 define cells 27 in rows or columns corresponding to the support frames 20 and the grating bars 26 of adjacent cells are mutually orthogonal. This alternating arrangement can be appreciated in the check pattern extending over the working surface of the simulator.

The functional significance of the alternating arrangement of the grating bars 26 is twofold. Firstly, the grating bars 26 are free to slide longitudinally within their slots 25 for the purposes of thermal expansion without distortion but once they have slid to a limited extent (a maximum of 10 mm in the preferred embodiment), they will bear against the non-castellated wall 10A of a neighbouring support frame 20 and so can slide no further. This is important under the dynamic sideways loads likely to be imparted by a swerving or braking fire tender or other emergency vehicle. Secondly, a major benefit of the grating 6 is its ability to dissipate the flow of incoming jets of water or other fire-fighting agents and so to prevent the dispersive medium being disturbed by those jets being played directly on the working surface of the simulator. As the dissipating effect of a straight grating of wholly aligned elements might conceivably be overcome if the incoming jet is aligned with the elements, the alternating arrangement of grating bars 26 has the benefit that it will reliably disrupt jets of water striking the working surface from any angle. In any event, any water that does get through the working surface while retaining damaging momentum will be dissipated by the baffle effect of the walls 10A, 10B between the support frames 20, under the working surface.

To help visualise the size of each frame 20, and strictly by way of example only, their pitch or spacing between centres is nominally 1 metre and so the overall width of each frame is 990 mm square to leave a thermal expansion gap of 10 mm all round. The walls 10A, 10B of each frame are 25 mm thick and stand a total of 200 mm above the base of the recess. Each grating bar 26 is of 80 mm×30 mm black bar and the slots 25 that receive the grating bars 26 are of corresponding dimensions. About 170 mm is therefore available under the grating bars 26 and above the base of the recess to accommodate the fuel distribution pipes 12 and the surrounding layer of gravel 9. The spacing between neighbouring grating bars 26 of a given support frame 20 is no greater than 33 mm so as to present no trip hazard to trainee fire-fighters walking on the working surface. The pitch or spacing between centres of the grating bars 26 is therefore nominally 66 mm and there is provision for thirteen of such bars 26 on each support frame 20.

A grating specified as above can withstand the maximum wheel load of a Major Airport Crashtruck (MAC). Performing structural analysis according to the requirements of BS5950:Part1:1985 using ANSYS 5.0A, and assuming a mass of the tender of 501.1 kN and a maximum axle load of 130 kN, the grating can comfortably withstand braking from 20 kph.

Moreover, the considerable mass of the grating bars 26 (in the order of 250 kg/m$^2$) imparts thermal inertia that makes them slow to attain damaging temperatures. During typically short bursts of use from cold (anything longer than three minutes of practice fire-fighting is rare in view of the need for extreme speed in real-life aviation fire-fighting), their temperature keeps well within the parameters appropriate to ordinary personal protection equipment (PPE) routinely worn by fire-fighters. Fire-fighter protective footwear and other PPE is rated to withstand temperatures up to 200 Celsius; tests show that the mass of the grating bars 26 keeps their temperature to about 180 Celsius even after exposure to the radiated heat flux of a fire with flame temperatures between 700 and 1100 Celsius.

A beneficial side-effect of the considerable girth of the grating bars 26 is that corrosion will not significantly reduce their cross-section and hence load-bearing strength during their projected working life. Consequently, the working surface of the simulator needs no expensive or fragile corrosion treatments, and is essentially maintenance-free.

The load-bearing ability of the working surface is heightened by the elegant design of the fabricated support frames 20, in which downward loads are transferred directly to the foundations through the vertical walls 10A, 10B without putting the aforementioned welds under damaging tensile or bending loads.

As already mentioned, the embodiment shown in FIG. 5 et seq is modular in nature. Specifically, it is envisaged that a standard module comprises a serpentine fuel distribution pipe 12, an associated fuel supply control unit and nine support frames 20 in a 3×3 array and hence, with the above dimensions, gives a working surface that covers 9 m$^2$. Several such modules can be used together to construct a simulator having a working surface of any required size, such as the one shown in FIG. 10 which comprises eight modules on each side of the central trench 4, giving a total working area of 144 m$^2$ excluding the area of the trench 4 itself. In practice, the working area of a simulator will generally be substantially greater so that large props can be placed on the working surface and correspondingly wide-ranging fuel spills can be simulated.

Figure 9:
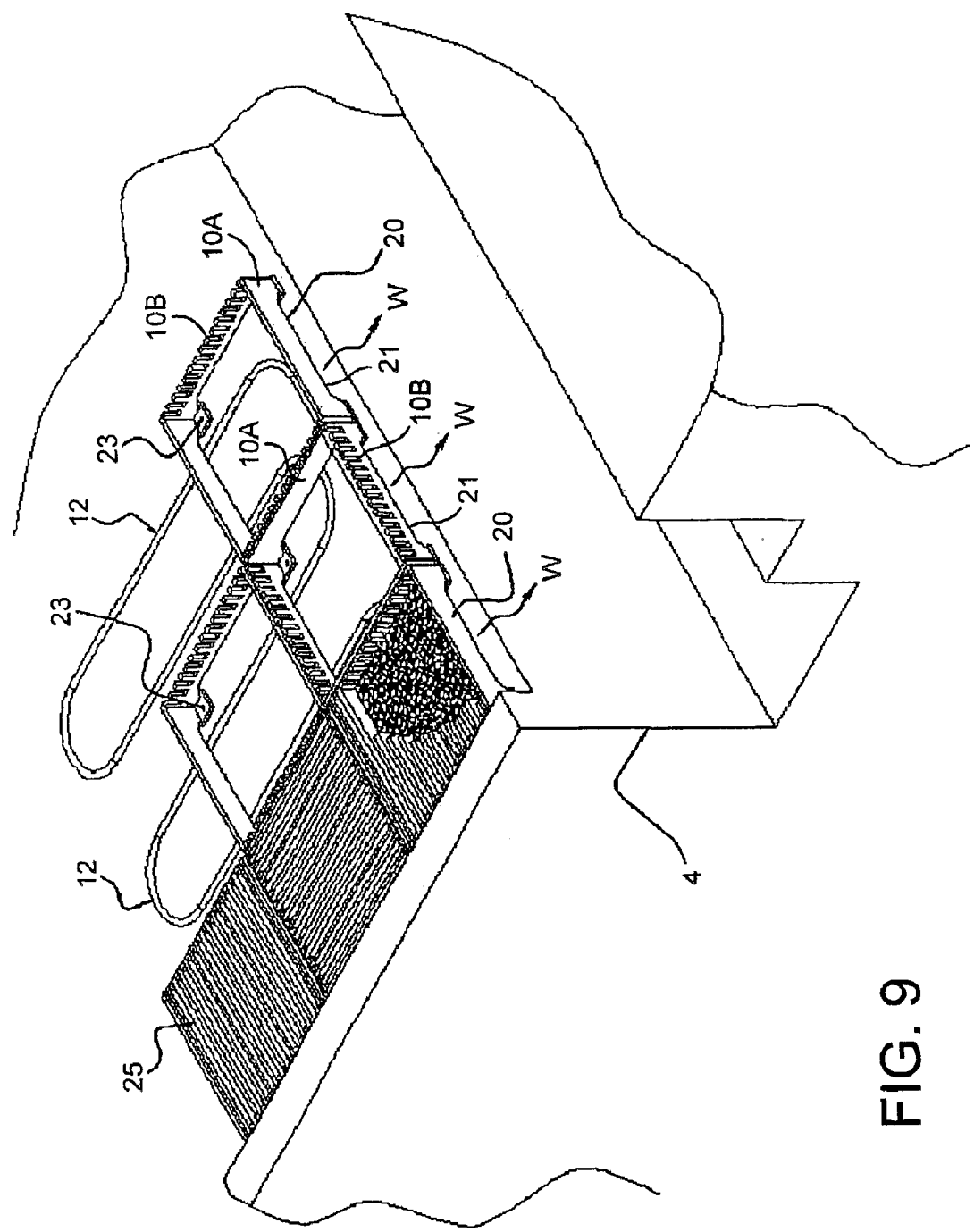
FIG. 9 is a perspective part-sectioned view of part of the array of support frames bordering the central trench of FIG. 5, showing their drainage provisions.

The central trench 4 featured in FIGS. 5, 9 and 10 is covered by a removable vented cover 17 as shown in FIGS. 5 and 10, which can be lifted when it is necessary to gain access to the control equipment 5 and ancillary equipment, such as valve trains and service pipework, within the trench 4.

Figure 11A:
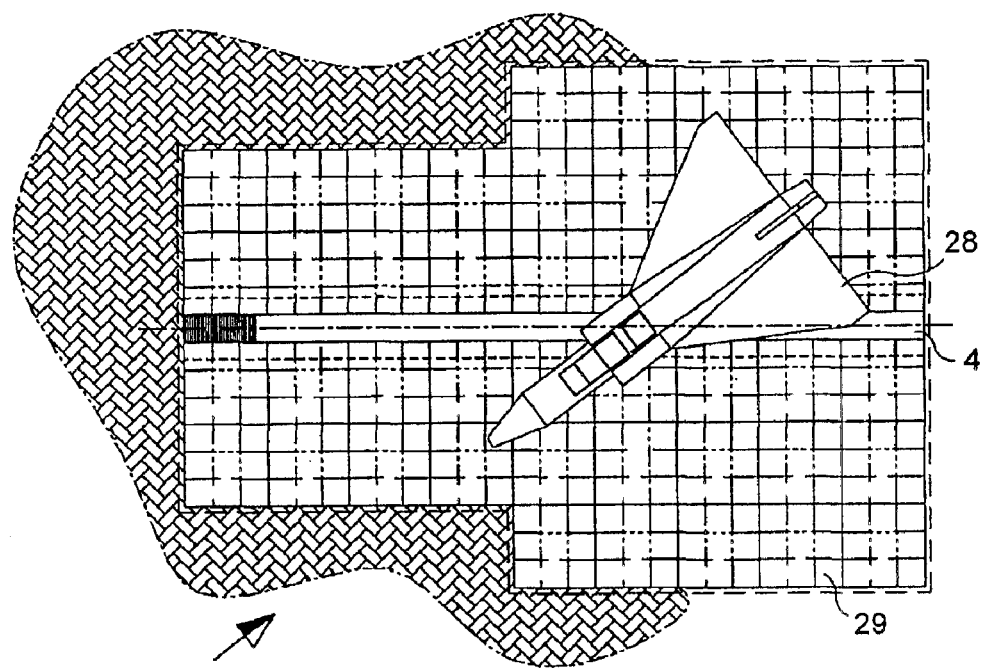
FIGS. 11(a) and 11(b) are schematic plan views of a simulator corresponding to that shown in FIGS. 5 and 10, showing how a prop such as a mock-up aircraft can be positioned and re-positioned on the working surface.
Figure 11B:
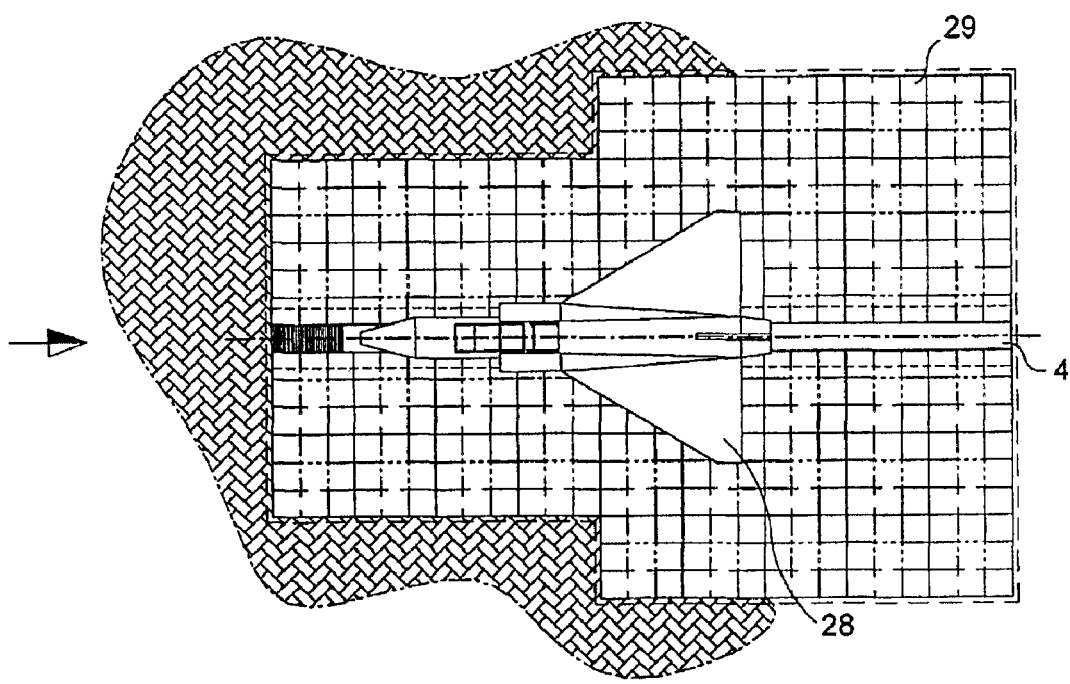

FIGS. 11(*a*) and 11(*b*) show how a prop 28, in this case a mock-up of a military jet, can be placed freely on the working surface of a simulator akin to that of FIG. 10. In both drawings, the prop 28 is aligned with the prevailing wind shown by the arrows as this is the direction in which a crash-landed aircraft is most likely to lie, although other angles to the prevailing wind can obviously be simulated for wide-ranging practice. In FIG. 11(*a*), the prevailing wind is offset by about 30° with respect to the central trench 4 of the simulator and the central longitudinal axis of the prop 28 is similarly aligned. However in FIG. 11(*b*), the prevailing wind is aligned with the trench 4 and the prop 28 has been re-aligned accordingly and also advanced across the working surface. Highly advantageously, the prop 28 can simply be dragged across the working surface from one orientation to the other, with no need of a crane to lift the prop 28.

Figure 12:
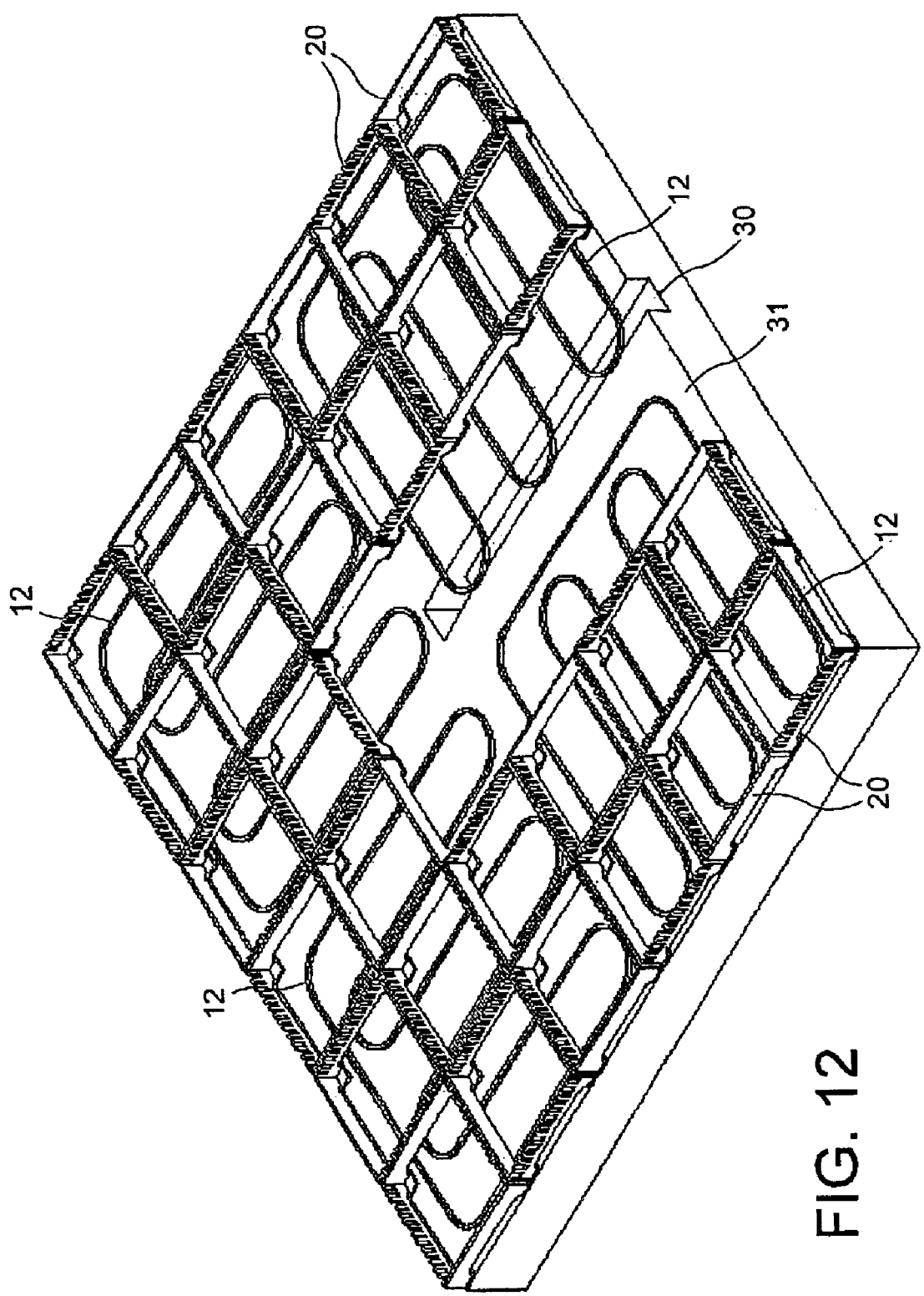
FIG. 12 is a partial schematic perspective view of a simulator arrangement suitable for Secondary Incident Training (SIT) scenarios.
Figure 13:
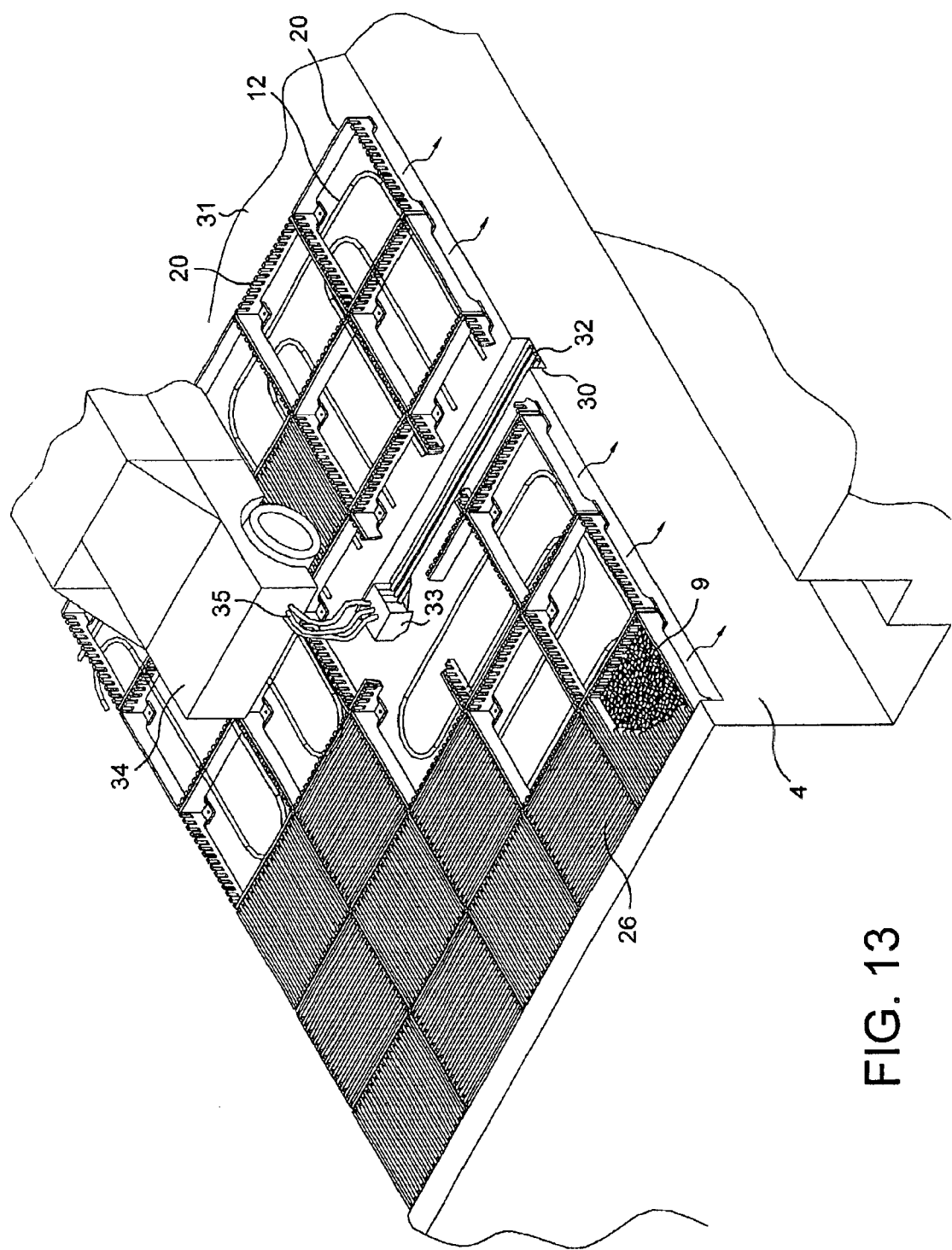
FIG. 13 is a partial schematic perspective view of the simulator arrangement of FIG. 12, but showing a SIT prop on the working surface of the simulator and enabled for use.
Figure 14:
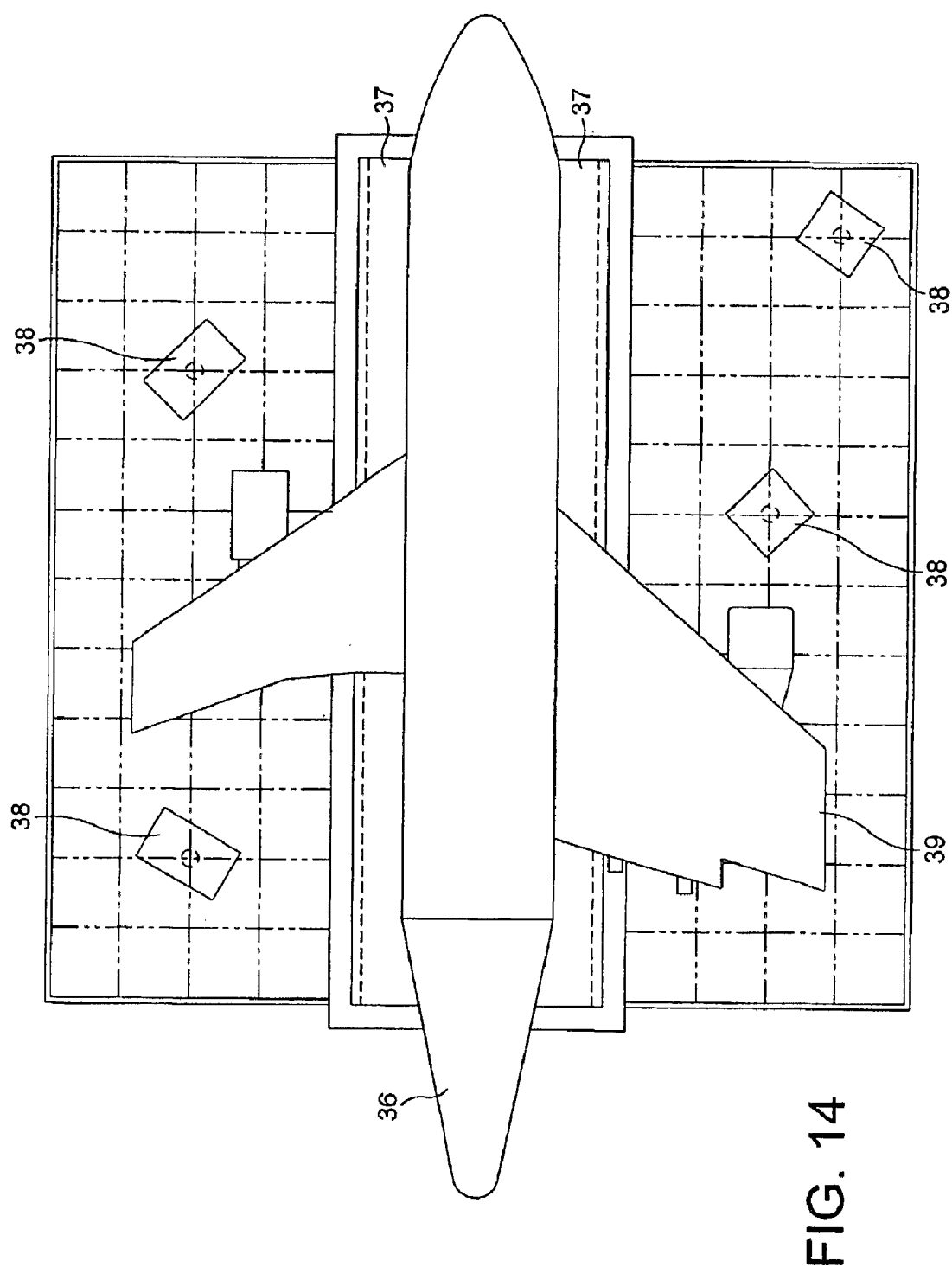
FIG. 14 is a schematic plan view of a simulator having a main prop and showing locations for siting auxiliary SIT props used to enact various SIT scenarios.

Moving on finally to FIGS. 12, 13 and 14, these drawings illustrate a further embodiment of the invention suitable for fire-fighter training involving so-called secondary incidents. Specifically, a main or primary incident—for example, an aircraft crash landing—could well be accompanied by one or more secondary incidents such as a collapsed building hit by the aircraft or a burning airport vehicle set alight by a fuel spill from the aircraft. Training for that kind of eventuality is known in the art by the acronym SIT, standing for Secondary Incident Training.

The embodiment of FIGS. 12, 13 and 14 caters for SIT by providing one or more locations on and under the working surface of the simulator that can be adapted to enable the use of one or more secondary props in parallel with, or instead of, a main prop. This is achieved by the provision of a channel 30 formed in the base 31 of the recess, which channel 30 extends from the central trench 4 under the fuel distribution pipes 12 to a desired location under the working surface. The channel 30 itself is best shown in FIG. 12, whereas FIG. 13 shows the channel 30 filled with service supply links 32 (such as a pilot fuel duct, a main flame fuel duct and control/electronics cabling) and terminating in a SIT control unit 33 to which those service supply links 32 run. In this way, each channel 30 contains the services necessary to fuel and control a small SIT scenario.

In normal use of the simulator with a main prop (not shown), the service supply links 32 and the SIT control unit 33 remain dormant under the grating 6, which continues to present an uninterrupted working surface. Indeed, the fuel distribution pipes 12 remain undisturbed and so, with suitable heat-shielding, the service supply links 32 and the SIT control unit 33 can be left buried under gravel 9 for the purposes of normal fire simulation, burning fuel supplied via the fuel distribution pipes 12 at that location.

When a SIT scenario is to be enacted, a small SIT prop 34 (in this case, resembling a car that will simulate a small vapour fire) is dragged across the working surface to near the location of the SIT control unit 33. The service supply links 32 and the SIT control unit 33 can then be enabled simply by removing sufficient grating bars 26 (which lift out easily from their castellated support frames 20) and underlying gravel 9 to gain access to the SIT control unit 33, whereupon the flexible connections 35 necessary to bring pilot fuel, main fuel, control signals and electrical power to the nearby SIT prop 34 can simply be plugged into the SIT control unit 33. The flexible connections 35 can be shrouded by a protective sleeve (not shown) if they are exposed to flame, as they will be in FIG. 13, although some SIT props may make provision for internal connection to the SIT control unit 33 in such a way that the prop itself shields the connections from the flames.

Only one channel 30 is illustrated in FIGS. 12 and 13 for the purposes of clarity. However, for optimum flexibility, there are preferably a few similarly-equipped channels 30, such as four of them, leading to different locations dispersed around the working surface of the simulator. Such an arrangement is shown in FIG. 14 in which a main prop 36 representing a full-size Boeing 747-400 aircraft, which is optionally a permanent fixture, has extensive fuel spill simulators 37 to the port and starboard sides. Here, four locations for possible SIT scenarios are represented as blocks 38. One example could be a SIT prop fabricated to represent a re-fuelling tanker servicing the aircraft and so located near a wing 39, and a multi-scenario training exercise could begin with an incident with the tanker, escalating to a fuel spill fire, escalating to a larger fuel spill fire and finally involving the aircraft itself. The simulated fire could spread to, or the scenario could otherwise involve, other SIT props at other locations on the working surface of the simulator.

In general, the props can be moved, swapped and interchanged with great flexibility to create fresh training scenarios involving interaction between a main incident, a fuel spill and one or more secondary incidents, that can be adapted readily to suit the prevailing weather and the needs of the trainees. This fosters the ability to set up 'joint services' training involving combinations of fire, police and paramedic services, and ensures that scenarios remain instantly controllable so that if, for example, a genuine incident occurs during training, crews can break off from training and attend that incident without delay.

Many variations are possible within the inventive concept. For example, whilst a gravel bed is preferred as a dispersive medium where such a medium is to be used, the grating of the invention could alternatively be used over a pan of water acting as the dispersive medium. Consequently, reference should be made to the appended claims and to other conceptual statements herein rather than to the foregoing specific description in determining the scope of the invention.

What is claimed is:

1. A fire simulator comprising fuel distribution means for distributing fuel under a grating through which fuel emanating from the fuel distribution means can rise in use to create flames extending above the grating, wherein the grating includes a plurality of grating elements that together define a walkable working surface for a fire-fighter using the simulator and wherein the working surface can be driven upon by a fire-fighter vehicle without damaging the fuel distribution means, which vehicle can drive on and off the working surface from and onto a surrounding or neighbouring apron.

2. The fire simulator according to claim 1, wherein the working surface is aligned at its periphery with the surrounding or neighbouring apron.

3. The fire simulator according to claim 1, wherein the fuel distribution means is housed in a recess below the grating, the recess having a base below the level of the surrounding or neighbouring apron.

4. The fire simulator according to claim 3, wherein a pan in the recess contains the fuel distribution means.

5. The fire simulator according to claim 1, wherein the grating elements are supported by grating supports that stand beside the fuel distribution means below the grating elements.

6. The fire simulator according to claim 5, wherein the grating elements are removable from the grating supports.

7. The fire simulator according to claim 6, wherein grating elements can be lifted away from the grating supports and out of the working surface.

8. The fire simulator according to claim 5, wherein the grating elements are spaced from the fuel distribution means by the grating supports.

9. The fire simulator according to claim 5, wherein the grating supports are defined by a plurality of hollow support frames.

10. The fire simulator according to claim 7, wherein each support frame includes upright peripheral walls surrounding a cavity.

11. The fire simulator according to claim 10, wherein walls of the frame have lower edge portions shaped to define a drainage opening.

12. The fire simulator according to claim 10, wherein walls of the frame have upper edge portions shaped to receive an array of grating elements that bridge the cavity, the array defining a portion of the working surface.

13. The fire simulator according to claim 10, wherein the grating elements are movable with respect to the support frame.

14. The fire simulator according to claim 13, wherein the grating elements move until they encounter a neighbouring support frame.

15. The fire simulator according to claim 1, wherein the fuel distribution means is covered by a fuel-dispersive medium from which dispersed fuel rises through the grating.

16. The fire simulator according to claim 15, wherein support frames each include upright peripheral walls surrounding a cavity and the fuel-dispersive medium is accommodated in the cavity and defines a bed extending under the working surface subdivided by the walls of a plurality of support frames.

17. The fire simulator according to claim 1, wherein the fuel distribution means is associated with fuel-heating means for applying to the fuel distribution means radiant heat that emanates from the flames in use, thereby promoting vaporisation of liquid fuel in the fuel distribution means.

18. The fire simulator according to claim 17, wherein the fuel-heating means absorbs radiant heat emanating from the flames and radiates to the fuel distribution means some of the heat thus absorbed.

19. The fire simulator according to claim 17, wherein the fuel-heating means reflects some of the radiant heat emanating from the flames.

20. The fire simulator according to claim 17, wherein the fuel-heating means includes a layer of particulate refractory material.

21. The fire simulator according to claim 20, wherein a foraminous sheet or mesh is interposed between the fuel distribution means and the layer of particulate refractory material.

22. The fire simulator according to claim 1 and being arranged such that the grating elements remain below 200 Celsius in use.

23. The fire simulator according to claim 1 and including a prop supported by its working surface.

24. The fire simulator according to claim 23, wherein the prop can be moved across the working surface while being supported by the working surface.

25. A fire simulator comprising fuel distribution means for distributing fuel under a grating through which fuel emanating from the fuel distribution means can rise in use to create flames extending above the grating, grating supports that stand beside the fuel distribution means below and support an array of grating elements and are defined by a plurality of hollow support frames each comprising upright peripheral walls surrounding a cavity, the walls of the frame having castellated upper edge portions shaped to receive the array of grating elements that bridge the cavity and comprise a portion of a walkable grating working surface for fire-fighters using the simulator.

26. The fire simulator according to claim 25, wherein the walls are in a rectangular or square arrangement around a correspondingly-shaped cavity.

27. The fire simulator according to claim 26, wherein the support frames are laid in intersecting rectilinear arrays with walls of neighbouring frames aligned with and facing one another.

28. The fire simulator according to claim 25, wherein a plurality of grating elements are disposed in a parallel array across the cavity.

29. The fire simulator according to claim 28, wherein the support frames are laid in a row and wherein the orientations of grating elements in neighbouring frames are mutually orthogonal.

30. A fire simulator comprising fuel distribution means for distributing fuel under a grating through which fuel emanating from the fuel distribution means can rise in use to create flames extending above the grating, the grating comprising a plurality of grating elements that together define a walkable working surface for a fire-fighter using the simulator and grating supports that stand beside the fuel distribution means below an array of grating elements and are defined by a plurality of hollow support frames each comprising upright peripheral walls surrounding a cavity, wherein fixing plates are attached to the lower edge of the walls of the frames to provide for fixing the frames to a foundation or base.

31. A fire simulator comprising fuel distribution means for distributing fuel under a grating through which fuel emanating from the fuel distribution means can rise in use to create flames extending above the grating, wherein the grating includes a plurality of grating elements that together define a walkable working surface for a fire-fighter using the simulator and wherein the grating elements comprise a plurality of separate elongate bars each having at least one face that defines part of the working surface when the bar is oriented generally horizontally for use.

32. A fire simulator comprising fuel distribution means for distributing fuel under a grating through which fuel emanating from the fuel distribution means can rise in use to create flames extending above the grating, wherein the grating includes a plurality of grating elements that together define a walkable working surface for a fire-fighter using the simulator and the simulator further comprises a service trench surrounded by or bordering the working surface and including a movable or removable access cover that lies flush with the working surface.

33. The fire simulator according to claim 32, wherein the cover is vented to permit free venting of gases from the service trench.

34. The fire simulator according to claim 32, wherein the service trench contains control equipment for lighting and fuelling the flame, and defines walls having cavities into which the control equipment is recessed.

35. The fire simulator according to claim 32, wherein the service trench drains fire-fighting water or rainwater that runs through the grating.

* * * * *